United States Patent [19]

Roback et al.

[11] Patent Number: 5,242,767
[45] Date of Patent: Sep. 7, 1993

[54] BATTERY HOUSING ASSEMBLY WITH INTEGRAL LIMITED TRAVEL GUIDE RAILS

[75] Inventors: Kenneth J. Roback, Arlington Heights; Terrence E. Derdzinski, Fox River Grove, both of Ill.

[73] Assignee: Motorola, Inc., Schaumburg, Ill.

[21] Appl. No.: 995,562

[22] Filed: Dec. 22, 1992

Related U.S. Application Data

[63] Continuation of Ser. No. 620,168, Jun. 22, 1992, abandoned.

[51] Int. Cl.$^5$ .................. H01M 2/10; H01M 2/02
[52] U.S. Cl. .................. 429/97; 429/123; 320/2
[58] Field of Search .......... 320/2; 429/1, 97, 98, 429/99, 100, 123

[56] References Cited

U.S. PATENT DOCUMENTS 4,904,549  2/1990  Goodwin et al. ............ 429/97

Primary Examiner—Mark L. Bell
Assistant Examiner—Anthony J. Green
Attorney, Agent, or Firm—Kevin D. Kaschke

[57] ABSTRACT

A battery housing base (300) with an integral, sliding channel mechanism (507) for attaching a battery to portable electronic equipment (102) is disclosed. The slide-on battery (105) is captivated by limited travel guide rails (307 through 312) within the sliding channels (507) along each opposite edge of the mating surface (302) of the battery housing base (300). Indentations (313 through 316) are disposed between neighboring limited travel guide rails (307 through 312). The indentations (313 through 316) enable the limited travel guide rails (307 through 312) to be manufactured using a single shot injection, straight pull ejection molding process and to be easily attached to the portable electronic equipment (102). The single shot injection mold process controls all critical interface dimensions on the battery housing base (300) for proper attachment to the portable electronic equipment (102). The critical interface dimensions are disassociated from the attachment of a battery housing base (300) to the battery housing cover (202).

11 Claims, 4 Drawing Sheets

BATTERY HOUSING ASSEMBLY WITH INTEGRAL LIMITED TRAVEL GUIDE RAILS

This is a continuation of application Ser. No. 07/620,168, filed Jun. 22, 1992 and now abandoned.

FIELD OF THE INVENTION

This invention relates generally to battery housing apparatus and more particularly to a battery housing base with an integral, limited travel, sliding channel mechanism having an indentation disposed between neighboring guide rails.

BACKGROUND OF THE INVENTION

Miniature electronic equipment is often portable in nature, and, as such, requires a portable source of power such as a battery. A battery supply may be conveniently attached to the housing of the miniature electronic equipment and make electronic contact by way of a conventional connector. To make battery changing easier, mechanisms have been devised to enable the user to easily disconnect the spent battery and replace it with a freshly charged battery. It has been proven desirable to securely affix the detachable battery to the miniature electronic equipment by way of a sliding channel and latching mechanism. As the equipment becomes smaller, however, it has become increasingly difficult to control the dimensions of the features critical to the interface between the battery and the electronic equipment. Critical interface features include the sliding channels, latch and battery contacts.

Typically, battery housings are assemblies having a housing base and a housing cover which are joined to each other to encompass electrochemical cells contained within the assembly. The sliding channel features are often designed into the battery housing assembly as a combination of features in the housing base and the housing cover. Variation in the assembly process attaching the base to the cover sometimes results in variation in the dimensions of the sliding channels. Variation in the dimensions of the sliding channels causes the position of the latch and battery contacts on the battery housing to vary relative to the slides. As a result, the battery may not fit or function properly when attached to the electronic equipment. Thus, it would be advantageous to manufacture all the critical interface features as part of the base so that their dimensions relative to each other may be controlled.

The difficulty in manufacturing all the critical interface features in the battery housing base arises in creating the guide rails for the sliding channels. The sliding channel usually has three inside surfaces forming a "U" shape. The guide rails are usually elongated protrusions disposed at intervals on one of the two parallel side surfaces inside the channel. The bottom surface of the channel is usually disposed perpendicularly to the two side surfaces. The guide rails are parallel to the bottom surface. Using conventional molding processes, the sliding channels, latch and battery contact receptacles are molded into the battery housing base anticipating a straight pull ejection from the tooling cavity. The guide rails in the sliding channels, however, are position perpendicularly to the direction of ejection from the tooling cavity.

One approach that has been considered involves insert molding. Using this process, the sides of the sliding channels including the guide rails are molded separately first then inserted into a second mold which forms the remaining two sides of the sliding channel and the complete molded battery housing base. The problem with this approach is that it is both labor and time intensive to complete the two stage molding process.

Another approach which has been considered involves comolding. Using this process, the side of the sliding channels including the guide rails are molded separately in a first cycle. One part of the tool is removed and replaced with a second part which has the remaining features of the sliding channel and the complete battery housing base. A second mold cycle is initiated to produce the completed battery housing base. The problem with this approach is that there are no automated comolding tools available which mold the first stage in a straight pull direction and the second stage in a pull direction perpendicularly to the first stage pull. Developing a specialized comolding process for a battery housing base would be expensive.

Thus, there is a strong need for a battery housing base with an integral, limited travel, sliding channel mechanism having guide rails which can easily be manufactured, has controlled critical interface dimensions and has its critical interface dimensions disassociated from the attachment of a battery housing cover.

SUMMARY OF THE INVENTION

A battery housing assembly for portable electronic equipment has first and second mating housing portions enclosing electrochemical cells therebetween. The first housing portion has an attaching surface by which the battery housing assembly is detachably connected to the portable electronic equipment. A channel is disposed in the attaching surface of the first housing portion. The channel includes an elongated guide rail disposed on a side surface and extending along the side surface parallel to the attaching surface for engaging the portable electronic equipment when connected thereto. An indentation, at least as long as the elongated guide rail, is disposed in the side surface and adjoined to one end of the elongated guide rail for providing predetermined clearance adjacent to the guide rail to facilitate manufacture thereof.

DESCRIPTION OF A PREFERRED EMBODIMENT

Figure 1:
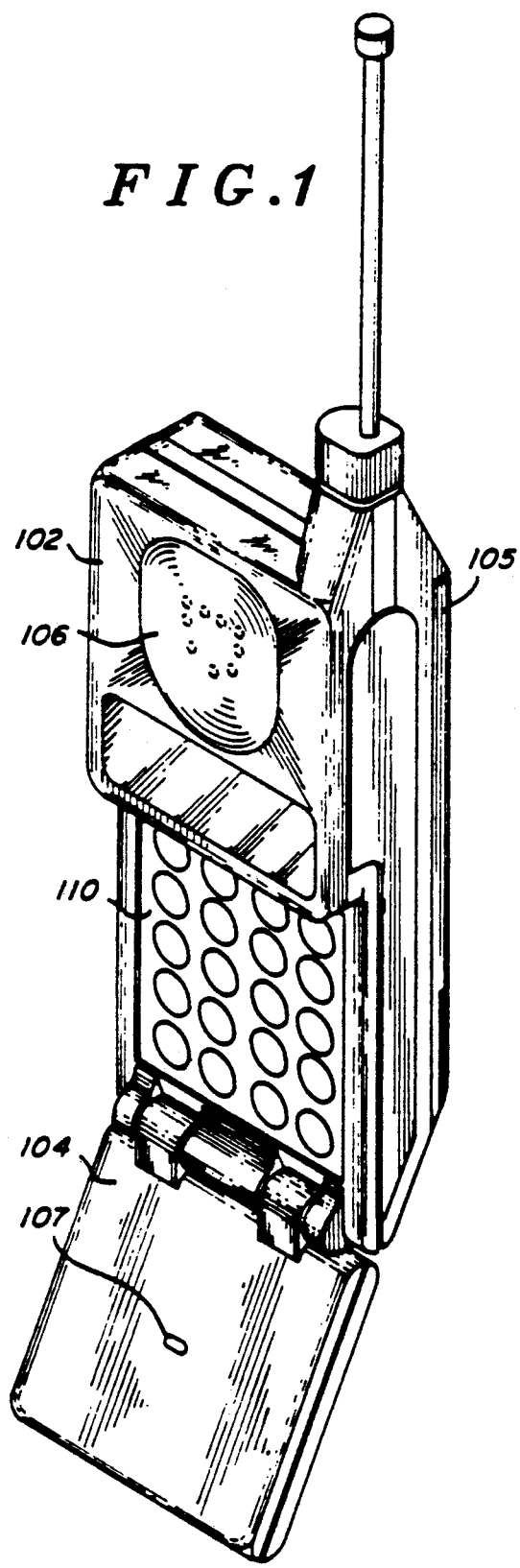
FIG. 1 is an isometric drawing of a hand-held portable radiotelephone which may employ the present invention.

A portable radiotelephone adapted to be used in a cellular radiotelephone system is shown in FIG. 1. The present invention may be employed in such a portable radiotelephone as well as in other miniature electronic equipment. The illustrated portable unit consists of two external portions, a body portion 102 and a flip element portion 104, in addition to a detachable battery 105. The drawing of FIG. 1 shows the flip element 104 in an "open" position such that a user of the portable unit may listen via earpiece 106 and may speak into a microphone 107. A telephone dial, or keypad, 110 consists of a plurality of buttons numbered one through zero, #, and *, in a familiar telephone arrangement. The keypad 110 also has additional function buttons such as "send", "end", "on/off", and other buttons associated with telephone number recall.

Since the portable radiotelephone of FIG. 1 is indeed portable, some source of electrical energy is necessary to power the electrical functions of this radiotelephone. The source of this electrical energy is a battery 105 which is typically implemented as a rechargeable electrochemical cell or cells. It is expected that the user will be able to either recharge the battery while the battery is attached to the radio or detach the battery from the radio and charge it separately.

Figure 2A:
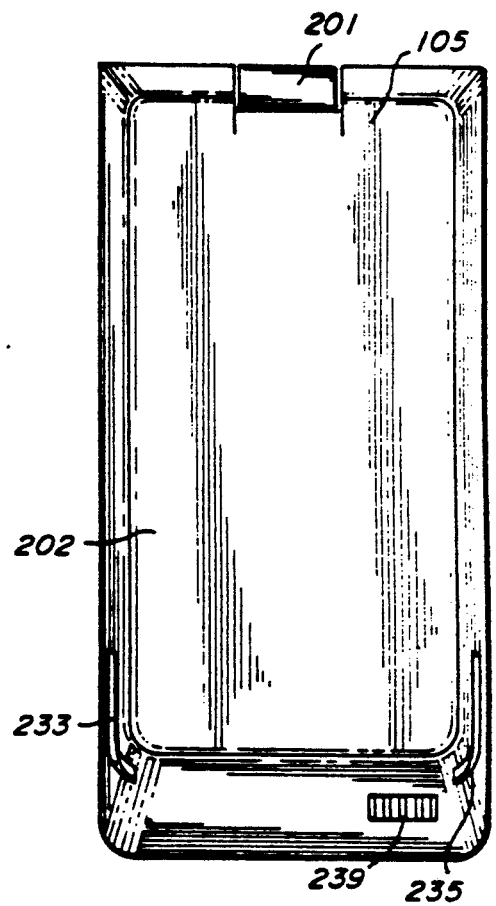
FIGS. 2A and 2B are drawings of a battery housing (FIG. 2A) and portable radiotelephone (FIG. 2B) in which the battery has been detached from the portable radiotelephone.

Referring now to FIG. 2A, the configuration of the detachable battery 105 can be apprehended in the condition where the battery 105 is detached from the portable radiotelephone of FIG. 1. In the preferred embodiment of the present invention, the battery housing consists of two halves, a base 300 in FIG. 3 and a cover 202 in FIG. 2A, which are permanently affixed together. A conventional set of electrochemical battery cells (not shown) may be sandwiched between and captivated by the two plastic housing portions which may be secured together to form an integral battery housing package.

Figure 2B:
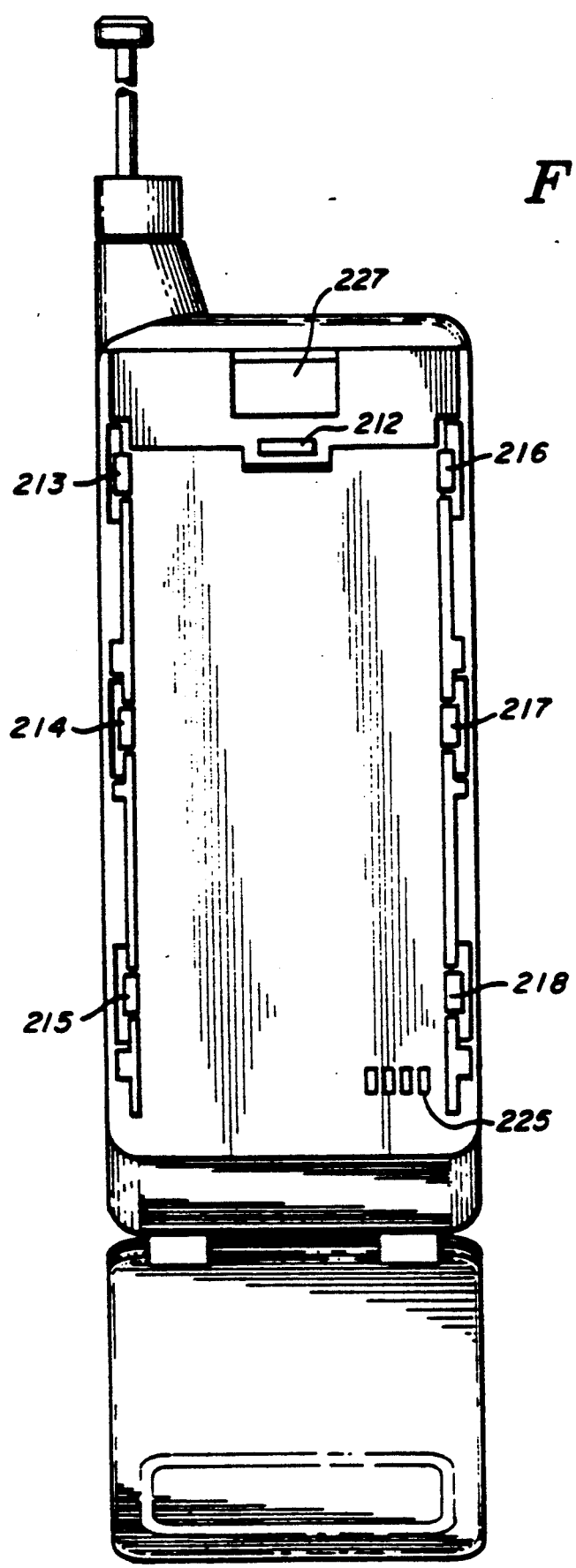

An integral latch mechanism 201 is integrally molded on the battery housing base. The latch mechanism is molded into the inside half of the plastic housing. To disengage the battery 105 from the portable radiotelephone 102, the latch mechanism 201 is pushed at the portion visible in FIG. 2A thereby causing a torsion beam (not shown) to rotate and cause a catch (not shown) to retract from a pocket 212 in the portable radiotelephone 102. (The portable radiotelephone 102, in a rear elevation view with the battery removed, is shown in FIG. 2B). This action releases the battery from its locked position and enables the battery housing 105 to be removed from the portable radiotelephone 102. The mating surface of the portable radiotelephone 102 has a pocket or indented slot 212 which is so formed and positioned that it engages the catch portion of latch mechanism 201 when the battery housing 105 is located in its fully attached position. The battery housing is thereby locked in place. Guide rails 213 through 218 extend from a surface of the portable radiotelephone housing 102 and are disposed opposite similar guide rails on the battery housing 105. The guide rails of the battery housing 105 are captivated beneath guide rails 213 through 218 of the portable radiotelephone housing 102 when the battery housing 105 is in its operational (and locked) position. The operational position is, of course, when electrical contacts 225 have contacted mating contacts 325 (not visible) of the battery housing 105.

Lateral slots 233 and 235 in FIG. 2A on opposite sides of the battery housing assembly 105 are located in a position such that the battery alone or the battery and portable radiotelephone together may slide into a common battery charging unit and be properly oriented relative to the battery charging contacts 239.

Figure 3:
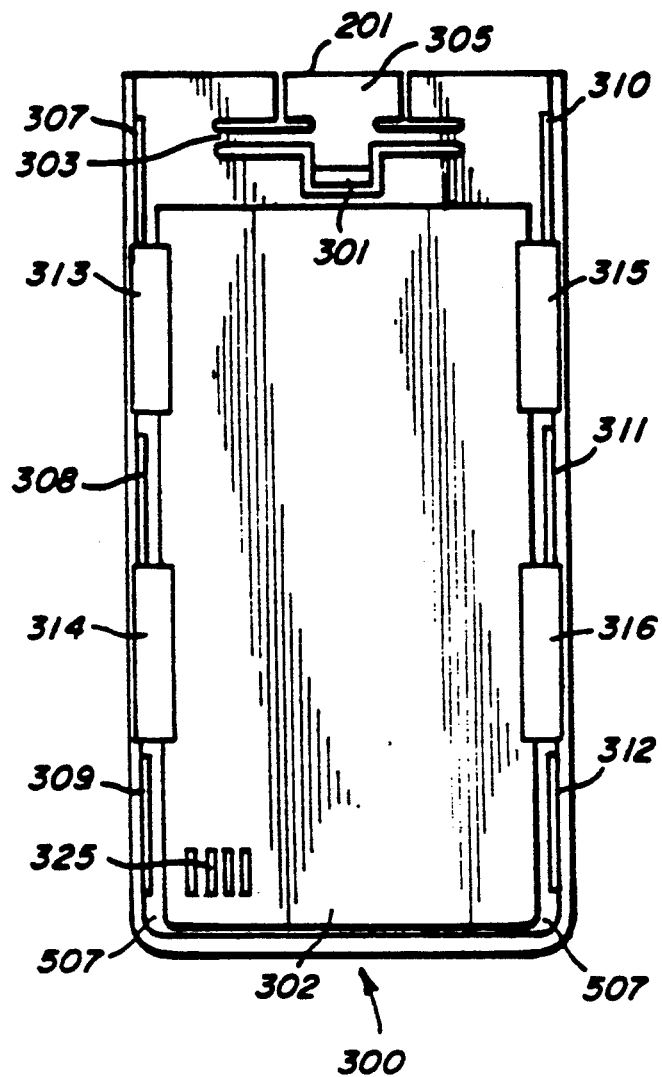
FIG. 3 is a view of the mating service of the battery housing base of the battery of FIG. 2A showing the integral latch, electrical contacts and reduced travel guide rails.

The surface 302 of the battery housing base 300 which mates to the portable radiotelephone of FIG. 2B is shown in the elevation view of the mating surface of FIG. 3. The housing base 300 generally includes the latch mechanism 210, sliding channels 507, battery contact receptacles 325 and indentations 313 through 316. The latch mechanism 201 is seen in greater detail in FIG. 3 and it can be perceived how the catch 301 rotates about the torsion bar 303 when the button portion 305 is pressed by the user to remove the battery. Such a button pressing in a direction out of the plane of the page of FIG. 3 (and into indented area 227 of the portable radiotelephone housing 102) causes torsion bar 303 to rotate and move catch 301 into the plane of the page of FIG. 3. This motion disengages the catch 301 from slot 212 (shown in FIG. 2B) thereby unlocking the battery housing and enabling the user to slide the battery along guide rails 307 through 312. Shortened guide rails 307 through 312, disposed on the parallel surfaces of each channel facing each other, with gaps in between each, enable secure fastening of the battery housing 105 to the portable radiotelephone housing 102 the entire length of the battery housing 105 while allowing a short travel displacement of the battery housing before the battery housing may be disengaged and removed from the portable radiotelephone 102. When guide rails 307 through 312 are fully disengaged from the portable radiotelephone housing, the battery electrical contacts 325 are disengaged from the battery input electrical contacts 225 on the portable radiotelephone housing. Once guide rails 307 through 312 have moved past the opposing guide rails 213 through 218 on the portable radiotelephone housing 102, the battery 105 may be lifted clear of the portable radiotelephone 102.

In the preferred embodiment, the guide rails 307 through 312 are bullet shaped (better illustrated in FIG. 4) but in alternate embodiments they may resemble other shapes to accomplish the same function. The guide rails 307 through 312 must be elongated and parallel to the attaching surface 302 of the battery housing 300 and their mating surfaces must be coplanar with the mating surfaces of the opposing guide rails 213 through 218 on the portable radiotelephone housing 102.

A feature of the preferred embodiment of the present invention is an indentation in the gap between two neighboring guide rails. The battery housing base includes four such indentations 313 through 316. In the preferred embodiment, the indentations form a slight recessed step in the three surfaces of the sliding channel 507. The indentations may not be limited to a recessed step; they may also a recessed slope or any shape which is lower than the plane on which the protrusions are disposed. The indentations have two purposes. The first purpose is to enable the guide rails 307 through 312 to be manufactured as an integral part of the housing base 300. The manufacturing process uses a single shot injection, straight pull ejection molding process. This manufacturing process is inexpensive and has a fast molding cycle time. An advantage of molding the guide rails 307 through 312 as part of the battery housing base 300 is that critical interface dimensions between the battery housing base 300 and the portable radiotelephone 102 can be controlled. It is important that the relative dimensions between the guide rails 307 through 312, the latch mechanism 201, and the battery contact receptacles 325 be controlled to ensure proper fit and function of the battery 105 to the portable radiotelephone housing 102. Another advantage of having all critical dimensions controlled on the battery housing base 300 is that the critical dimensions are not affected by the attachment of the battery housing cover 202.

The second purpose of the indentations 313 through 316 on the battery housing base 300 is to enable easy assembly of the battery housing 105 to the portable radiotelephone housing 102. The indentations 313 through 316 increase the width of the sliding channel in the gap between the guide rails on the battery housing base 300. The increased width allows the guide rails 307 through 312 on the portable radiotelephone housing 102 to be inserted into the gap with less restriction. The guide rails 307 through 312 on the portable radio telephone housing 102 have a bullet shape on their leading ends to glide off of the recessed steps in the battery housing channel. Therefore, a user of a portable radiotelephone can more easily attach a mating battery.

Figure 4:
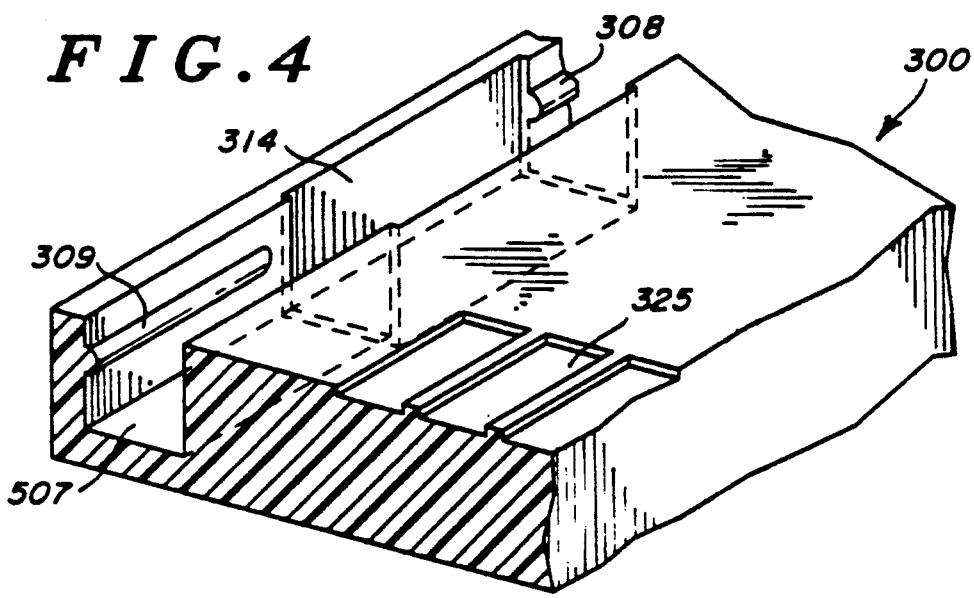
FIG. 4 is a cross sectional view in perspective of a portion of the battery housing base shown in FIG. 3.

Now referring to FIG. 4, there is shown a cross-sectional view in perspective of a portion of the battery housing base 300. This portion shows in more detail one indentation 314 disposed in the sliding channel between two guide rails 308 and 309. As FIG. 4 shows, the indentation is recessed into all three sides of the sliding channel. The length of the indentation 314 is at least as long as the length of the guide rail 309. The depth of the recessed step on all three sides of the slide is typically 0.07 mm. The flat end of the guide rail 308 adjoins the indentation 314. As previously mentioned, the indentation 314 enables the guide rails 307 through 312 to be molded as an integral part of the battery housing base 300. In general, the indentations clear the gap between the guide rails allowing the part of the tool creating the guide rails to slide into the gap. The direction of the sliding action is from guide rail 308 to guide rail 309. Due to the sliding action direction, the guide rail 308 must adjoin the indentation 314 so the sliding tool may clear the guide rail 308. Once the tool is clear of the guide rails, the battery housing base is ejected from the tool cavity. The sliding and ejecting steps of the tooling process is similar to the battery housing 105 detaching from the portable radiotelephone 102.

The integral guide rails are molded using a four step process once the plastic material has been shot into the mold and the mold has cooled down. In the preferred embodiment, the housing portions are molded from polycarbonate plastic or similar material. The first step is to remove the part of the tool creating the indentation. The second step is to slide the part of the tool creating the guide rails approximately 22 mm. This sliding motion positions the part of the tool creating the guide rails 308 and 309 into the gap. The indentation 314 ensures that the sliding action of the sliding tool will not bind or catch a part of the housing base 300 creating the sliding channel in the gap. Typically, the sliding tool may bind when the plastic shrinks before the tool can slide into the gap. Also, the sliding tool can catch on flash, created by a tool adjacent to the sliding tool, as the tool slides. The indentation eliminates both of these problems. Once the tool creating the guide rails has slid into the gap, the third step is to open the mold up and the fourth step is to eject the battery housing base 300 from the tool cavity.

Figure 5:
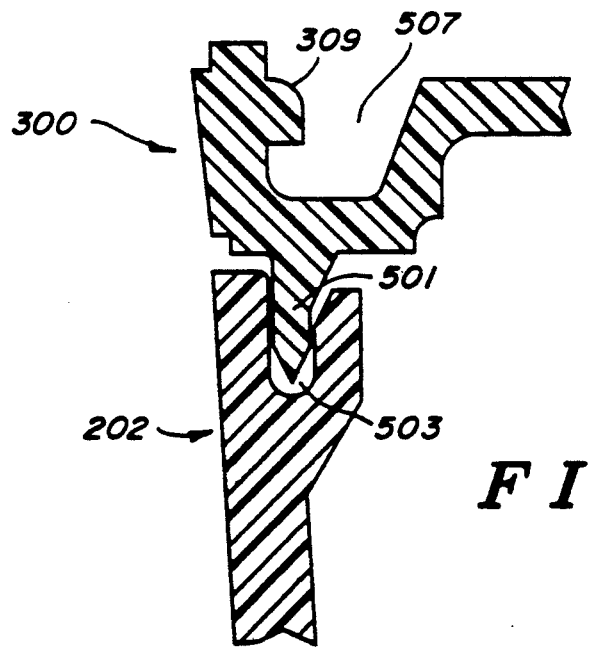
FIG. 5 is a cross-sectional view of the battery housing base and cover of FIG. 2A before they are assembled to each other.

Now referring to FIG. 5, there is shown a cross-sectional view of the battery housing base 300 and the battery housing cover 202 before their attached to each other. In the preferred embodiment of the present invention, the base 300 is attached to the cover 202 using an ultrasonic welding process. Using this process, a pointed protrusion 501 on the battery housing base 300 is inserted into a groove 503 in the battery housing cover 202. Once inserted an ultrasonic horn applies energy to the battery housing base 300 which causes the protrusion 501 to fuse to the groove 503. This operation performs a secure and permanent bond between the base 300 and the cover 202. A feature of the preferred embodiment of the present invention is that the attachment method between the base 300 and the cover 202 does not alter the form, fit or function of the guide rails 309 within the sliding channel 507. For the user of a portable radiotelephone, this feature translates into a battery that will always have a proper form, fit and function of the guide rails within the sliding channel, latch mechanism and battery contacts to the portable radiotelephone housing 102.

Therefore, a battery housing base having an integral, limited travel, sliding channel mechanism with guide rails to provide short travel between the engaged and disengaged position of the battery housing on a portable radiotelephone has been shown and described. The housing base is easily manufactured using a single shot injection, single pull ejection molding process. Critical interface dimensions on the housing base are controlled and disassociated from the attachment of the battery housing cover.

What is claimed is:

1. A battery housing assembly for portable electronic equipment having at least first and second mating housing portions enclosing electrochemical cells therebetween, the first housing portion having at least one attaching surface by which the battery housing assembly is detachably connected to the portable electronic equipment, the battery housing assembly comprising:
   at least a first channel disposed in the attaching surface of the first housing portion, said first channel further comprising:
   (a) at least a side surface;
   (b) at least one elongated guide rail disposed on said side surface and extending along said side surface parallel to the attaching surface for engaging the portable electronic equipment when connected thereto; and
   (c) at least one indentation, at least as long as said elongated guide rail, disposed in said side surface and adjoined to at least one end of said elongated guide rail for providing a clearance adjacent to the guide rail to facilitate manufacture thereof.

2. A battery housing assembly in accordance with claim 1 wherein the first housing further comprises a latch mechanism.

3. A battery housing assembly in accordance with claim 1 wherein the first housing further comprises at least one battery contact registration receptacle.

4. A battery housing assembly in accordance with claim 1 wherein said at least one indentation is a recessed step.

5. A battery housing assembly in accordance with claim 1 further comprising a second channel, essentially parallel to said first channel, disposed in the attaching surface of the first housing portion.

6. A battery housing assembly in accordance with claim 5 wherein said second channel further comprises:
   (a) at least a side surface;
   (b) at least one elongated guide rail disposed on said side surface and extending along said side surface parallel to the attaching surface for engaging the portable electronic equipment when connected thereto; and (c) at least one indentation, at least as long as said elongated guide rail, disposed in said side surface and adjoined to at least one end of said elongated guide rail for providing a clearance adjacent to the guide rail to facilitate manufacture thereof.

7. A battery housing assembly for portable electronic equipment having at least first and second mating housing portions enclosing electrochemical cells therebetween, the first housing portion having at least one attaching surface by which the battery housing assembly is detachably connected to the portable electronic equipment, the battery housing assembly comprising:

at least a first channel disposed in the attaching surface of the first housing portion, said first channel further comprising:
  (a) at least a side surface;
  (b) at least one elongated guide rail disposed on said side surface and extending along said side surface parallel to the attaching surface for engaging the portable electronic equipment when connected thereto; and
  (c) at least one indentation, at least as long as said elongated guide rail, disposed in said side surface and adjoined to at least one end of said elongated guide rail for providing a clearance adjacent to the guide rail to facilitate manufacture thereof;

a latch mechanism; and at least one battery contact registration receptacle.

8. A battery housing assembly in accordance with claim 7 wherein said at least one indentation is a recessed step.

9. A battery housing assembly in accordance with claim 7 further comprising a second channel, essentially parallel to said first channel, disposed in the attaching surface of the first housing portion.

10. A battery housing assembly in accordance with claim 9 wherein said second channel further comprises:
  (a) at least a side surface;
  (b) at least one elongated guide rail disposed on said side surface and extending along said side surface parallel to the attaching surface for engaging the portable electronic equipment when connected thereto; and
  (c) at least one indentation, at least as long as said elongated guide rail, disposed in said side surface and adjoined to at least one end of said elongated guide rail for providing a clearance adjacent to the guide rail to facilitate manufacture thereof.

11. A battery housing assembly for portable radiotelephone equipment having at least first and second mating housing portions enclosing electrochemical cells therebetween, the first housing portion having at least one attaching surface by which the battery housing assembly is detachably connected to the portable radiotelephone equipment, the battery housing assembly comprising:

at least a first and second channel, essentially parallel to each other, disposed in the attaching surface of the first housing portion, said first and second channels each further comprising:
  (a) at least a side surface;
  (b) at least one elongated guide rail disposed on said side surface and extending along said side surface parallel to the attaching surface for engaging the portable radiotelephone equipment when connected thereto; and
  (c) at least one indentation, at least as long as said elongated guide rail, disposed in said side surface and adjoined to at least one end of said elongated guide rail for providing a clearance adjacent to the guide rail to facilitate manufacture thereof; and a latch mechanism; and at least one battery contact registration receptacle.

* * * * *